United States Patent [19]
Busby

[11] 3,833,882
[45] Sept. 3, 1974

[54] CHARACTER READING SYSTEM

[75] Inventor: John W. Busby, Newtown, Pa.
[73] Assignee: Busby Venture Corporation, Newton, Pa.

[22] Filed: Apr. 28, 1972
[21] Appl. No.: 248,566

[52] U.S. Cl. .................... 340/146.3 J, 340/146.3 Z
[51] Int. Cl. .................... G06k 9/10
[58] Field of Search .................... 340/146.3 J, 146.3 Z

[56] References Cited
UNITED STATES PATENTS

| | | | |
|---|---|---|---|
| 3,245,037 | 4/1966 | Brust | 340/146.3 J |
| 3,257,545 | 6/1966 | Berkel | 340/146.3 Z |
| 3,588,457 | 6/1971 | Bijlfueld | 340/146.3 Z |

*Primary Examiner*—Paul J. Henon
*Assistant Examiner*—Robert F. Gnuse
*Attorney, Agent, or Firm*—Woodcock, Washburn, Kurtz & Mackiewicz

[57] ABSTRACT

A stylized character reading system in which timing is effectuated by "self-clocking" on the characters themselves thereby eliminating the need for precise horizontal placement of the characters as required by systems in which separate clocking tracks or edge of document detectors are used and in which clock pulses are related to paper movement. In a preferred embodiment three sensors are used as character present sensors which read horizontal line portions of the characters and are used solely to detect the presence of a character. Two data sensors are used to detect vertical marks in the characters and send pulses to the input data register for character identification. The system further comprises a reader which includes the sensors, a self-clocking timing generator, end-of-character logic, even parity checker and a six-bit character code storage register with code recognition logic which may be coupled with code conversion logic to generate any appropriate machine language code.

7 Claims, 3 Drawing Figures

CHARACTER READING SYSTEM

BACKGROUND OF THE INVENTION

1. Field of the Invention

The present invention has utility in the field of data processing, whenever it is desirable to read only a limited number of characters as opposed to having the capability of reading a full alpha numeric set. The limited number of characters may comprise numeric characters, as well as a few additional symbols. While the system herein described employs optical character reading, the invention should not be limited to a specific reading means, and may be utilized with reading characters recorded by magnetism, fluorescent ink, embossing, and transparency or hole patterns.

2. Prior Art

A greatly simplified optical character reading system was developed using characters which were highly stylized and constrained. This enabled the number of reading zones of the character grid to be lessened. A preferred code in this system is one in which the characters are provided with parts which fall within six predetermined mark positions of generally parallel predetermined orientation on at least two scanning lines. The six mark positions together define a character position which has a specific predetermined location on the document defined by guide means which rigidly constrain possible mark positions. Different characters in the code employ different combination marks and both the marks and the absence thereof are used to recognize the character.

Prior to my earlier invention, it had been usual to begin analysis of a character by dissecting the character using a grid having a minimum of 20 bits. The more bits that were employed in the grid, the better the chance of identifying the character. Such a system necessitated a highly complex and very costly logic system which has been eliminated by my invention as disclosed in my copending application and which required only a simple scan and pick-up means, a simple pulse coincidence discrimination system, a pulse grouping means preferably collecting and storing pulses as binary bits, and a relatively simple straightforward one-step logic system. With this simplification, however, came a need for either great rigidity of the characters, as to size, shape and position on the document or an accurately printed set of clock marks.

In my earlier invention; clock marks were associated with every character position for identifying the characters. This necessitated the use of an additional scan line. With a printed clock track and a separate circuit which detects the marks, the edge of the document is sensed by a pulse generator tied in with a timing belt. A stream of pulses are sent out which are related to the paper movement. The horizontal positioning of the characters must be precisely positioned.

SUMMARY OF THE INVENTION

It is a principal object of the present invention to provide a reading system in which the characters themselves are "self-clocking" thereby permitting the horizontal position of the characters to vary somewhat.

It is a related object of the present invention to provide a reading system in which self-clocking may be used regardless of whether the system employs optical character reading, or characters recorded by magnetism, fluorescent ink, embossing, or transparency or hole patterns.

It is another object of the present invention to provide a reading system in which hand-printed characters may be used without being subjected to precise tolerances which diminish their practicality.

It is still another object of the present invention to provide a reading system in which binary encoding is accomplished within the characters themselves.

It is yet another object of the present invention to provide a reading system which eliminates the need for stringent tolerances on the horizontal location of characters.

In accordance with the above object, a system which is "self-clocking" within the characters themselves has been invented. Each character space is divided into two horizontal tracks, upper half and lower half, each with three vertical mark zones for a total of six possible code mark locations per character. Along with the vertical mark positions, each track has two safety zones between the vertical mark zones or positions. The characters can be scanned from either left to right or right to left with specific logic rules to initiate clock timing and end-of-character logic which will be explained in detail. A character is deemed to begin on the detection of the first mark in either the upper or lower track which is normally present in the first zone scanned or on detection of horizontal marks. The remaining safety zones and mark zones are determined by a timing means related to the speed of scan and self-adjusting on the basis of the vertical marks as actually received.

DESCRIPTION OF THE PREFERRED EMBODIMENT

Figure 1:
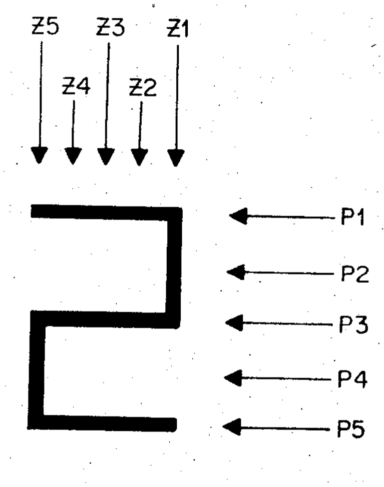
FIG. 1 shows a character space divided into vertical zones and upper and lower tracks and shows the position of the scan tracks.

With reference to FIG. 1, a character space is shown which is divided into an upper and lower half. Scan tracks extend horizontally across the character space with sensors P1 through P5 positioned to scan specific portions of the characters which must be positioned vertically in alignment with the scan tracks as shown.

Each character space is divided into vertical mark zones and safety zones as shown with the mark zones being Z1, Z3, and Z5 and the safety zones, Z2 and Z4. The mark zones are made reasonably wide for ease in hand printing. Marks are not permitted in the safety zones Z2 and Z4 to prevent erroneous encoding of characters. The character may be scanned from either left to right or right to left with specific logical rules to initiate clock timing and end-of-character logic referred to below. A character is deemed to begin on the detection of the first vertical marks in either the upper or lower track or by a signal from the character present logic as will be explained. The remaining safety zones and binary bit mark locations are determined by a timing means related to the speed of scan and self-adjusting on the basis of the vertical marks as actually received.

Figure 3:
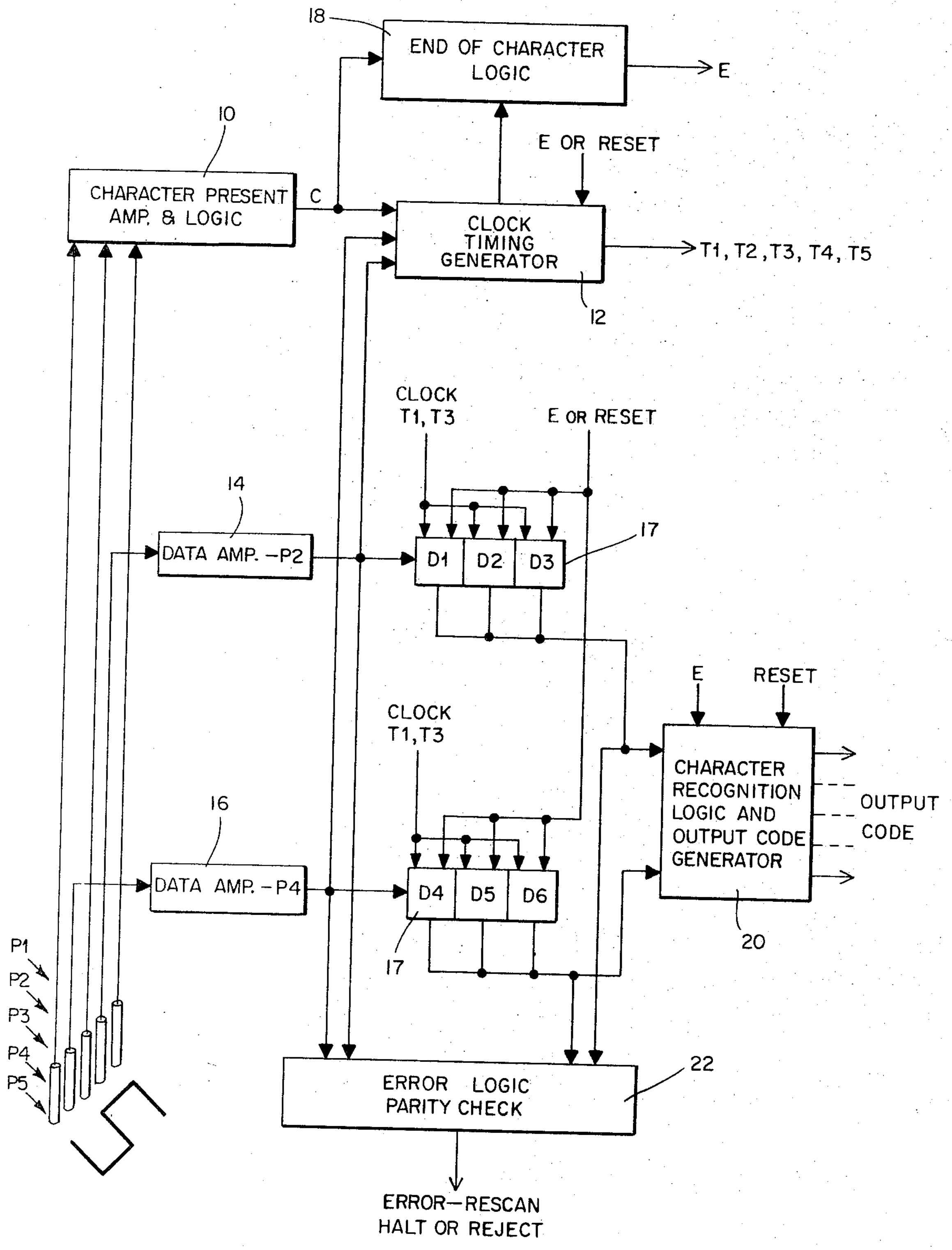
FIG. 3 shows a block schematic of the reading system.

Character present amplifiers and logic 10 shown in FIG. 3 normally receive information from sensors P1, P3 and P5 scanning the horizontal lines or tips of vertical lines of the character at the top, center and bottom. The characer present logic level C becomes true when the information signal in one or more of these channels rises above a suitable level for longer than a minimum time or a vertical data mark is sensed in either of the channels where sensors P2 or P4 are shown. These events may occur concurrently. The character present signal will be reset false on the fall of the composite signal from P1, P3 and P5.

Since P1, P3 and P5 function to give a character present signal when a mark or marks are contacted, it is possible to employ only one sensor instead of the three. This may be a photocell or other type sensor known to the optical scanning art. For example fiber optics or other light pipes may be used to branch out from the single photocell detector to the three scanning positions where, P1, P3 and P5 are shown at the top, center and bottom of the character space (FIG. 1 and FIG. 3). Photocells or other known sensing means may also be used for sensors P2 and P4, the primary function of which is to detect vertical lines for character recognition purposes. Solid state integrated circuit techniques may also be used for scanning and the sensors may comprise a solid state self-scanning vertical column photocell array.

While optical character reading is described throughout the specification, it should be clearly understood that mechanical sensing techniques, where for example the encoding elements comprise embossing or punched hole markings arranged in geometric patterns and magnetic and inking techniques, may be used as well.

The clock timing generator 12 is activated by the receipt of information from the character present amplifiers 10 and/or data amplifiers 14, 16 to initiate the timing pulses which shift data properly into the character code storage register D1 to D3 and D4 to D6 (17) and to indicate an error condition if data is received during scanning of the safety zones.

Timing pulses T1 to T5 which start when a character is detected will usually coincide with zones Z1 to Z5, since the first detected mark occurs typically in the center of Z1 and T1. The end of character logic 18 is utilized to set the output code register 20 after all the appropriate data for a character is received and to reset the input data register 17 as well as other control circuits in preparation for the next character.

With reference again to FIG. 3, the input data registers 17 comprise two three-section shift registers, D1 to D3 and D4 to D6, as mentioned earlier. D1 to D3 is for the upper half — character data marks coming from P2 and D4 to D6 is for the lower half — character data marks coming from P4. Data is shifted in each section at the end of T1 and T3. Normally at the end of T5 an end-of-character pulse would cause code parity to be checked and the code converted into the output code register with the appropriate code for future processing. The error logic 22 includes such things as parity check for an even number of code marks for the character, the receipt of data during safety zones T2 and T4 and the total absence of data marks from either P2 or P4 during a character present time interval. These error functions serve to indicate faulty or poor printing of the characters and/or a failure of components or wiring in the circuitry, both necessary for improved reliability in modern data systems.

Figure 2:
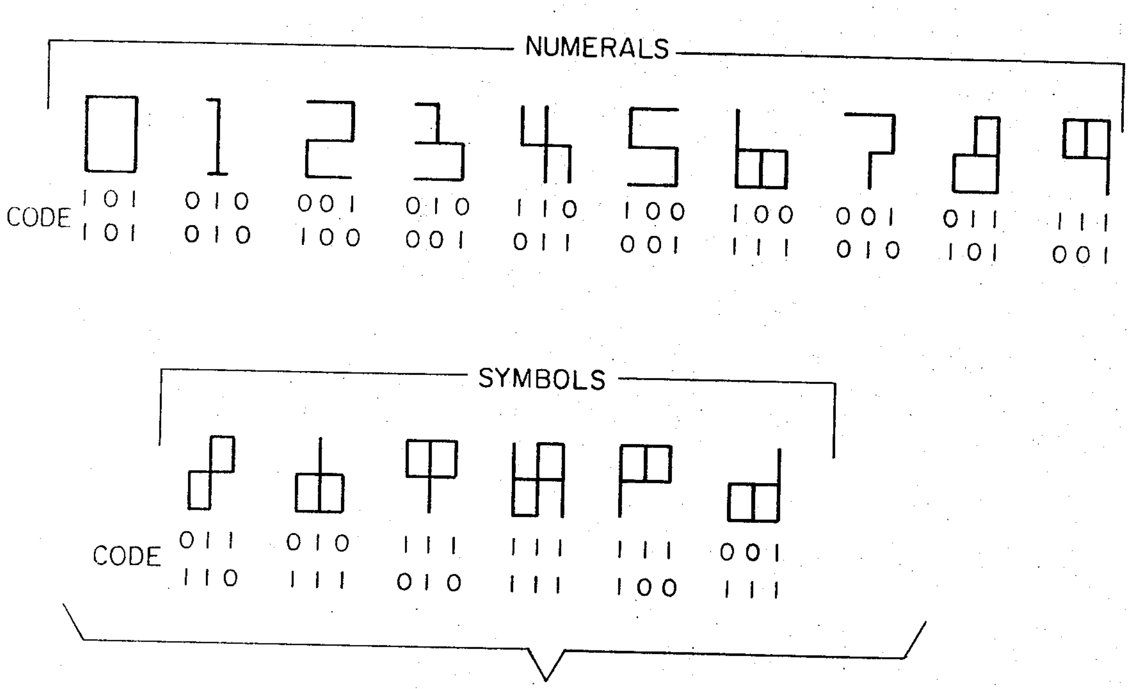
FIG. 2 shows the character set and corresponding code.

As shown in FIG. 2 the numerals 0 through 9 and six symbols are shown as an example of character possibilities. Below the characters are the binary codes that each of the highly stylized characters will signify. The upper row of the binary code is from the upper half of the character and produced by scan track P2; the lower row is from the lower half of the character and produced by scan track P4. Thus each track has three vertical mark positions for a total of six possible code mark locations per character.

In the case of the character 0, as it is scanned from right to left, P1, P3 and P5 along with P2 and P4 will simultaneously indicate the presence of a character and cause the character present logic level C to become true at Z1 zone. The clock timing generator 12 is activated to initiate the timing pulses which shift data into the character code storage register D1–D3 for P2 scan track and D4–D6 for P4 scan track. At the start D1 to D3 and D4 to D6 each read 000. Upon receipt of the timing pulses from P2 and P4 indicating the presence of a vertical line on each scan track at zone Z1, each of the registers read 100. At Z1, as mentioned above, a shift occurs and the registers each read 010. As P2 and P4 scan at Z3 no vertical lines are sensed hence the registers remain at 010. After Z3 the second shift occurs and each of the registers will then read 001. At Z5, P2 and P4 will each detect a vertical line and the registers will then read 101. This result is then transferred to the character recognition logic and output code generator 20 which may be of any suitable type known to the art.

In the special case of the numeral one the only two vertical marks occur during Z3 on the document but will occur during T1 in the electronic circuitry. The timing clock generator 12 must be reset early no later than T3, by the fall of character present and the generation of end-of-character pulse so that the system will be ready for the next character in the scan line.

In addition, obvious adjustments must be made in the timing clock generator 12 if the data is scanned from left to right instead of right to left especially on the characters three and seven when T2 time must be forced on the receipt of the first vertical data mark after the rise of character present logic level to the true state. The end of character logic 18 is utilized to set the output code register 20 after all the appropriate data for a character is received and to reset the input data register as well as other control circuits in preparation for the next character. The presence of a data mark in both D1 and D4 at T1 time followed almost immediately by the fall of character present indicates the "narrow" numeral one and causes an early initiation of the end-of-character pulse.

While various embodiments of the invention have been shown and described, it will be understood that various modifications may be made. The appended claims are, therefore, intended to define the true scope of the invention.

I claim:

1. Apparatus for identifying stylized characters which are made up of vertical and horizontal marks easily recognizable as arabic numerals and in which a horizontal mark extends throughout a character space and determines the length of said character space, comprising:

a. A first sensing means for sensing the horizontal mark;

b. Means for producing a character present signal from the horizontal mark when sensed;

c. means for producing a timing signal during the presence of said character present signal;

d. a second sensing means for sensing the vertical marks and producing an output representing the presence or absence of said vertical marks;

e. means responsive to said timing signal and said output for registering the presence and absence of said vertical marks to produce a binary signal pattern; and f. means to identify the characters from said binary signal pattern.

2. The apparatus of claim 1 in which the first sensing means comprises three sensors which scan across each of the character spaces at the top, bottom and center to detect horizontal lines and the means of producing a character present signal comprises character present amplifiers and logic.

3. The apparatus of claim 2 in which the second sensing means comprises two sensors one that crosses the bottom half of the character space and the other that crosses the top half of the character space which detect vertical lines.

4. The apparatus of claim 3 in which the means of producing a binary signal comprises two character code storage registers each having three stages in which data corresponding to the three zones in which vertical marks are read in the upper and lower track is shiftable.

5. A method for identifying stylized characters that are made up of vertical and horizontal marks easily recognizable as arabic numerals and in which a horizontal mark extends throughout a character space in at least two horizontal zones through said character and determines the length of said character space comprising the steps of:

scanning each of said characters with two sets of sensors simultaneously;

detecting the horizontal marks in the characters through at least two zones through the characters with the one set of sensors to produce a character present signal;

detecting vertical marks with the second set of sensors to produce an output representing the presence or absence of said vertical marks;

producing a timing signal during the presence of said character present signal;

generating a pattern of binary signals from said output representing the presence or absence of said vertical marks; and identifying said character from said binary signal pattern.

6. The method recited in claim 5 further comprising:

activating a timing clock generator by said character present signal to produce timing pulses;

shifting said output representing the presence and absence of vertical marks into an input character code storage register in response to said timing pulses; and transferring the contents of said storage register to an output code register for character recognition and future processing.

7. The method recited in claim 2 wherein said one set includes three sensors arranged to scan each character through approximately the top, middle and bottom portions thereof and wherein said second set includes two sensors arranged to scan each character in a zone between said top and middle portions and in a zone between said middle and bottom portions.

* * * * *